United States Patent
Dollar et al.

(10) Patent No.: US 8,231,158 B2
(45) Date of Patent: Jul. 31, 2012

(54) ROBUST COMPLIANT ADAPTIVE GRASPER AND METHOD OF MANUFACTURING SAME

(75) Inventors: Aaron Dollar, New Haven, CT (US); Robert Howe, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 233 days.

(21) Appl. No.: 12/447,939

(22) PCT Filed: Nov. 5, 2007

(86) PCT No.: PCT/US2007/083597
§ 371 (c)(1),
(2), (4) Date: May 1, 2009

(87) PCT Pub. No.: WO2008/058061
PCT Pub. Date: May 15, 2008

(65) Prior Publication Data
US 2009/0302626 A1    Dec. 10, 2009

Related U.S. Application Data

(60) Provisional application No. 60/864,252, filed on Nov. 3, 2006.

(51) Int. Cl.
*B66C 1/00* (2006.01)
(52) U.S. Cl. ............... 294/106; 294/111; 901/21
(58) Field of Classification Search .......... 294/106, 294/111; 623/21.15–21.17, 21.19; 414/2–5, 414/7; 901/21, 30, 31
See application file for complete search history.

(56) References Cited

U.S. PATENT DOCUMENTS

| | | | | |
|---|---|---|---|---|
| 3,694,021 A | * | 9/1972 | Mullen | 294/106 |
| 3,927,424 A | * | 12/1975 | Itoh | 623/63 |
| 4,351,553 A | | 9/1982 | Rovetta et al. | |
| 4,834,443 A | * | 5/1989 | Crowder et al. | 294/106 |
| 4,955,918 A | * | 9/1990 | Lee | 623/24 |
| 5,080,681 A | * | 1/1992 | Erb | 623/63 |
| 5,200,679 A | * | 4/1993 | Graham | 318/568.16 |
| 5,447,403 A | | 9/1995 | Engler, Jr. | |
| 5,501,498 A | | 3/1996 | Ulrich | |
| 5,762,390 A | | 6/1998 | Gosselin et al. | |

(Continued)

FOREIGN PATENT DOCUMENTS

WO   WO00/69375   11/2000

OTHER PUBLICATIONS

Sebastien Krut, A Force-Isotropic Underactuated Finger, Apr. 2005, 2325-2330.*
H. Hanafusa and H. Asada, "Stable Prehension by a Robot Hand with Elastic Fingers," Proceedings of the 7th Int'l Symposium on Industrial Robots, Tokyo (Oct. 1977), pp. 361-368.

*Primary Examiner* — Saul Rodriguez
*Assistant Examiner* — Stephen Vu
(74) *Attorney, Agent, or Firm* — 24IP Law Group; Timothy R. Dewitt

(57) ABSTRACT

A multi-fingered underactuated mechanical grasping system driven by a single actuator, yet can grasp objects spanning a wide range of size, shape, and mass. A member for moving a link relative to a base acts in parallel to a direction of compliance of a joint between the link and the base. The joint has a plurality of degrees of freedom. The number of members for moving links in the grasping system is less than the number of degrees of freedom in the grasping system.

18 Claims, 11 Drawing Sheets

U.S. PATENT DOCUMENTS

| | | | |
|---|---|---|---|
| 6,918,622 B2 * | 7/2005 | Kim et al. | 294/106 |
| 2001/0028174 A1 * | 10/2001 | Matsuda et al. | 294/106 |
| 2005/0040663 A1 * | 2/2005 | Kameda et al. | 294/106 |
| 2005/0121929 A1 * | 6/2005 | Greenhill et al. | 294/106 |
| 2005/0218679 A1 | 10/2005 | Yokoyama | |

* cited by examiner

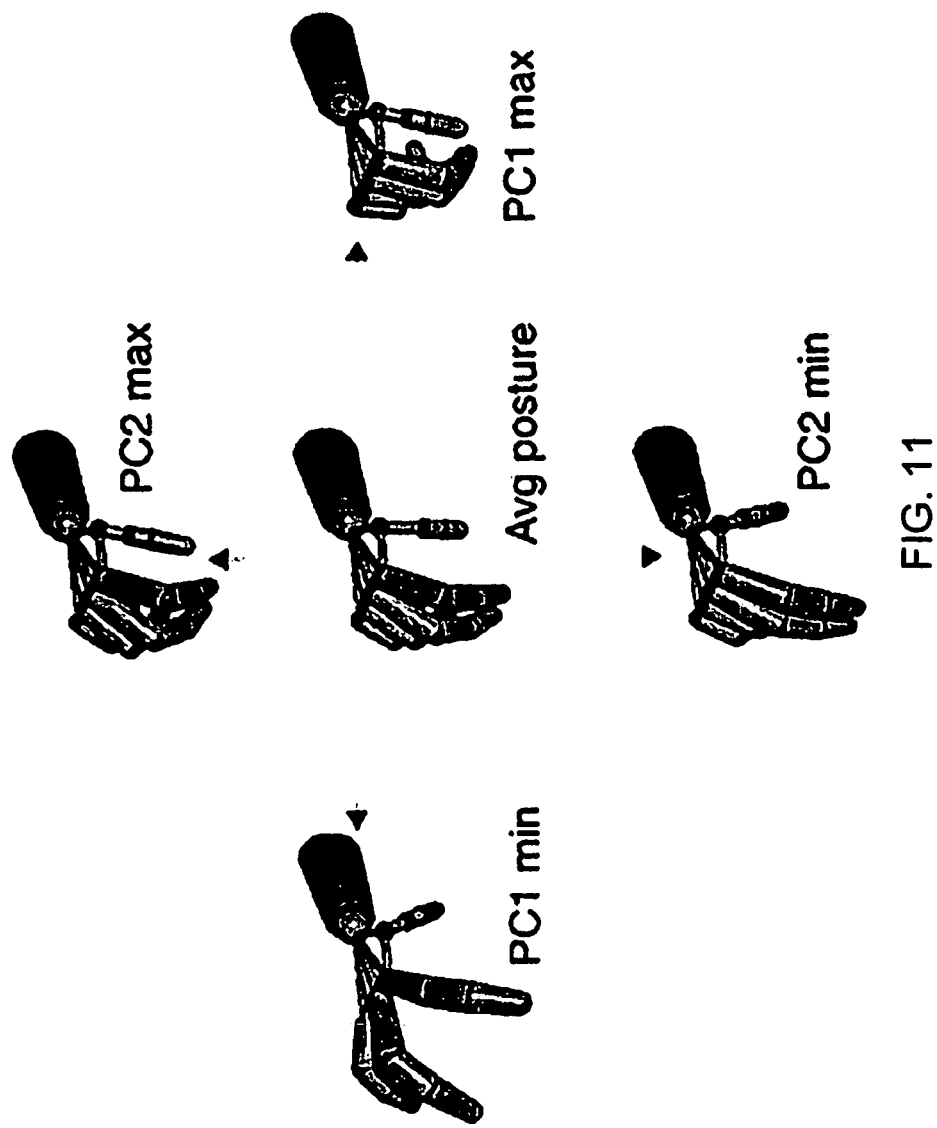

ROBUST COMPLIANT ADAPTIVE GRASPER AND METHOD OF MANUFACTURING SAME

CROSS-REFERENCE TO RELATED APPLICATIONS

The present application claims priority to and the benefit of the filing date of U.S. Provisional Patent Application Ser. No. 60/864,252 filed on Nov. 3, 2006, which is hereby incorporated by reference in its entirety.

STATEMENT REGARDING FEDERALLY SPONSORED RESEARCH OR DEVELOPMENT

This invention was made with government support under N00014-98-1-0669 awarded by the Office of Naval Research and DAMD17-01-1-0677 awarded by the U.S. Army. The government has certain rights in the invention.

BACKGROUND OF THE INVENTION

1. Field of the Invention

The present invention relates to robotic graspers or hands and, more particularly, to a robust compliant underactuated mechanical grasper and method of manufacturing the same.

2. Brief Description of the Related Art

After years of experimenting with complex, fully-articulated anthropomorphic hands, researchers have begun to embrace the idea that much of the functionality of a hand can be retained by careful selection of joint coupling schemes, reducing the number of actuators and the overall complexity of the grasping mechanism. Many of these grippers are 'underactuated', having fewer actuators than degrees-of-freedom. These types of graspers, grippers or hands have also been referred to as 'adaptive' or 'selfadaptable'. Other simplified hands have fixed-motion coupling between joints, reducing the overall degrees-of-freedom of the mechanism. These two classes of simplified grippers can be easier to control, much lighter, and less expensive than their fully-actuated counterparts.

The very nature of unstructured environments precludes full utilization of a complex, fully-actuated hand. In order to appropriately use the added degrees of actuation, an accurate model of the task environment is necessary. A gripper with a reduced number of actuators is not only simpler to use, it is more appropriate based on the quality of information available for the unstructured grasping task.

The joint coupling necessary to allow for underactuation is often accomplished through compliance in the manipulator structure. Compliance is perhaps the simplest way to allow for coupling between joints without enforcing the fixed-motion coupling relationship inherent with gear or linkage couplings. Compliant couplings are a simple way to allow a joint to passively deflect without causing a fixed-motion proportional change in the joints to which it is coupled.

Compliant underactuated grippers show particular promise for use in unstructured environments, where object properties are not known a priori and sensing is prone to error. Finger compliance allows the gripper to passively conform to a wide range of objects while minimizing contact forces. Passive compliance offers additional benefits, particularly in impacts, where control loop delays may lead to poor control of contact forces. See D. E. Whitney, "Quasi-static assembly of compliantly supported rigid parts," Journal Dyn. Syst. Measurement Control 104, pp. 65-77, 1982 and J. M. Schimmels and S. Huang, "A passive mechanism that improves robotic positioning through compliance and constraint," Robotics Comput.-Integr. Manuf. 12 (1), 65-71, 1996. Compliance can also lower implementation costs by reducing the sensing and actuation required for the gripper.

A number of underactuated and fixed-motion coupled robotic hands have been proposed. Those prior devices include the devices described in the following publications: [1] M. Higashimori, M. Kaneko, A. Namiki, M. Ishikawa, "Design of the 100G Capturing Robot Based on Dynamic Preshaping," *The International Journal of Robotics Research*, vol. 24 (9), pp. 743-753, 2005; [2] W. T. Townsend, "The BarrettHand Grasper—Programmably Flexible Part Handling and Assembly," *Industrial Robot—An International Journal*, vol 10 (3), pp. 181-188, 2000; [3] M. Rakic, "Multifingered Robot Hand with Self-Adaptability," Robotics and Computer Integrated Manufacturing, vol. 5(2/3), pp. 269-276, 1989; [4] J. Butterfass, G. Hirzinger, S. Knoch, H. Liu, "DLR's Multisensory Articulated Hand Part I: Hard- and Software Architecture," *Proceedings of the 1998 IEEE International Conference on Robotics and Automation*, pp. 2081-2086, 1998; [5] J. Butterfass, M. Grebenstein, H. Liu, G. Hirzinger, "DLR-Hand II: Next Generation of a Dextrous Robot Hand," *Proceedings of the 2001 IEEE International Conference on Robotics and Automation*, pp. 109-114, 2001; [6] A. Edsinger-Gonzales, "Design of a Compliant and Force Sensing Hand for a Humanoid Robot," *Proceedings of the 2004 International Conference on Humanoid Manipulation and Grasping* (IMG04), 2004; [7] J. Crisman, C. Kanojia, I. Zeid, "Graspar: A Flexible, Easily Controllable Robotic Hand," *IEEE Robotics and Automation Magazine*, pp. 32-38, June 1996; [8] S. Hirose and Y. Umetani, "The Development of Soft Gripper for the Versatile Robot Hand," *Mechanism and Machine Theory*, vol. 13, pp. 351-359, 1978; [9] T. Laliberte, L. Birglen, C. Gosselin, "Underactuation in Robotic Grasping Hands,"*Machine Intelligence & Robotic Control*, vol. 4 (3) pp. 1-11, 2002; [10] J. Ueda, Y. Ishida, M. Kondo, T. Ogasawara, "Development of the NAIST-Hand with Vision-based Tactile Fingertip Sensor," *Proceedings of the 2005 IEEE International Conference on Robotics and Automation*, pp. 2343-2348, 2005; [11] E. Torres-Jara, "Obrero: A platform for sensitive manipulation," *Proceedings of the 2005 IEEE-RAS International Conference on Humanoid Robots*, pp. 327-332, 2005; [12] C. S. Lovchik, M. A. Diftler, "The Robonaut Hand: A Dexterous Robot Hand for Space," *Proceedings of the 1999 IEEE International Conference on Robotics and Automation*, pp. 907-912, 1999; [13] K. DeLaurentis, C. Mavroidis, "Mechanical design of a shape memory allow actuated prosthetic hand," *Technology and Health Care*, vol. 10, pp. 91-106, 2002; [14] D. Caldwell, N. Tsagarakis, ""Soft" grasping using a dextrous hand," Industrial Robot: An International Journal vol. 27 (3), pp. 194-199, 2000; [15] R. Crowder, V. Dubey, P. Chappell, D. Whatley, "A Multi-Fingered End Effector for Unstructured Environments," *Proceedings of the 1999 IEEE International Conference on Robotics and Automation*, pp. 3038-3043, 1999; [16] M. C. Carrozza, C. Suppo, F. Sebastiani, B. Massa, F. Vecchi, R. Lazzarini, M. R. Cutkosky, P. Dario, "The SPRING Hand: Development of a self-Adaptive Prosthesis for Restoring Natural Grasping," *Autonomous Robots* 16, pp. 125-141, 2004; [17] N. Dechev, W. Cleghorn, S. Naumann, "Multiple finger, passive adaptive grasp prosthetic hand," Mechanism and Machine Theory 36, pp. 1157-1173, 2001; and [18] F. Lotti, P. Tiezzi, G. Vassura, L. Biagiotti, G. Palli, C. Melchiorri, "Development of UB Hand 3: Early Results," *Proceedings of the 2005 IEEE International Conference on Robotics and Automation*, pp. 4499-4504, 2005. Table I provides an overview of some of the features of those underactuated and fixed-motion coupled robotic hands.

TABLE 1

UNDERACTUATED AND FIXED-MOTION COUPLED ROBOT HANDS

| Hand | # fingers | Pitch joints per finger | Pitch actuators per finger | Coupling scheme (*indicates compliant coupling ^indicates adaptive mechanism) | Coupling ratio | Source of compliance and/or adaptability |
|---|---|---|---|---|---|---|
| 100G [1] | 2 | 2 | ½ | prox:*:dist | unknown | tendon routing, spring-loaded joints |
| Barrett [2] | 3 | 2 | 1 | prox:^:dist | (3:4) | "TorqueSwitch" differential |
| Belgrade/USC [3] | 4 + 1 | 3 + 0 | ½ + 1 | (prox;med;dist) + (prox;dist) | (~9;8;7) | rocker arm coupling of fingers |
| DLR I and II [4, 5] | 4 | 3 | 2 | med;dist | (1;1) | none |
| Domo [6] | 3 | 3 | 1 | prox;med*:dist | (1;1:passive) | unactuated compliant distal joint |
| Graspar [7] | 3 | 3 | 1 | prox:^:med:^:dist | (~5:4.2:2.9) | tendon differential mechanism |
| Hirose [8] | 2 | 10 | ½ | prox:(all):distal | (55:::28:::10:::1) | tendon routing |
| Laval 10-DOF [9] | 3 | 3 | ⅓ | prox:^:med:^:dist | unknown | adaptive linkage mechanism |
| NAIST [10] | 3 + 1 | 3 + 3 | 2 + 2 | (med;dist) + (med;dist) | (1;1.15) | none |
| Obrero [11] | 3 | 2 | 1 | prox:*:dist | (4:3) | series elastic actuation |
| Robonaut [12] | 2 + 2 + 1 | 3 + 3 + 2 | 2 + 1 + 2 | (med;dist) + (prox;med;dist) + 0 | (1;1) + (1;1;1) + 0 | compliant connector, no adaptability |
| Rutgers [13] | 4 + 1 | 3 + 3 | 2 + 2 | med:dist | unknown | tendon routing |
| Salford [14] | 4 + 1 | 3 + 3 | 2 + 3 | (med;dist) + 0 | unknown | none |
| SDM [15] | 2 | 2 | 1 | (prox:*:dist) | (4.5:1) | tendon routing, joints made of springs |
| Southampton [15] | 3 | 3 | 1 | prox:^:med:^:dist | unknown | differential unit |
| SPRING [16] | 2 + 1 | 3 + 2 | ⅓ + ⅓ | (prox:*:med:*:dist) + (prox:*:dist) | (2.9:1.6:1) | series elastic actuation |
| TBM [17] | 4 + 1 | 3 + 2 | 1 + 1 | (prox;med;dist) + (prox;dist) | (~2;1;1) + (~2;1) | none |
| UB III [18] | 2 + 2 + 1 | 3 + 3 + 3 | 3 + 2 + 2 | 0 + (med:*:dist) + (med:*:dist) | (~6:7) | tendon routing, joints made of springs |

An 'underactuated' hand has fewer actuators than degrees-of-freedom, and therefore demonstrates adaptive behavior. In these hands, motion of the distal links can continue after contact on the coupled proximal links occurs, allowing the finger to passively adapt to the object shape. In a 'fixed-motion coupled' hand, each actuator controls a single degree-of-freedom, and the mechanism has no 'adaptability' (final column). In these hands, motion of one joint always results in a proportional motion of the joint(s) coupled to it. In the same way, if contact occurs on one joint fixing its position, all coupled joints are thereby fixed.

In Table I, the '# fingers' column gives the number of fingers of each different type used in the hand, separated by '+'. Cases where two types are given indicate that some number of identical fingers and one thumb are used in the design. Cases where three types are given mean that two different finger designs are used in addition to a thumb. For example, the Robonaut hand incorporates two "grasping" fingers, two "dexterous" fingers, and a thumb. The second column indicates the number of 'pitch' joints per finger, leaving out 'yaw' and 'roll' joints, if any exist. Entries correspond to the data in the '# fingers' column. For the Robonaut hand, the grasping and dexterous fingers and thumb have three pitch joints each. The next column corresponds to the number of actuators per finger that control the pitch joints. Note that the degree of underactuation ranges from a single actuator for twenty joints (Hirose's "Soft Gripper") to twelve actuators for fifteen joints (UB III hand). The coupling scheme is indicated in the next column. 'Prox' indicates the proximal joint (nearest to the base), 'med' is the medial joint (for three phalanx fingers), and 'dist' is the distal joint (farthest from the base). A ':*:' between two joints indicates that the coupling between the two joints is compliant, such as those hands with joints made of springs. A ':^:' between two joints indicates that the coupling between the two joints is based on a mechanism that allows for decoupling. The BarrettHand, for example, achieves this effect by means of a "TorqueSwitch" differential gear mechanism that actively decouples the two joints once contact has been made on the inner link and a preset torque limit has been reached. A ';' between joints indicates that the coupling is fixed-motion, and therefore has no adaptability. The next column indicates the coupling ratio (prox:med:dist) between the joints. For a finger with some method of adaptability, this ratio is the relative angular motion between joints when the finger is freely actuated (i.e. no external contact). For Hirose's "Soft Gripper," every third value is given. The final column indicates the method by which the hand is passively compliant and/or adaptive, if at all.

Grasping and manipulating objects in unstructured environments, where object properties are not known a priori and sensing is prone to error, is one of the central challenges in robotics. The uncertainty in the relationship between the object and gripper makes it difficult to control contact forces and establish a successful grasp. One approach to dealing with this uncertainty is through compliance, so that positioning errors do not result in large forces and the grasper conforms to the object. Compliance has most often been implemented through control of manipulator impedance, based on active use of joint sensors for position, velocity and force.

While designing durable robots is rarely addressed in robotics research, it is essential in industrial, space, and military applications. Examples include iRobot's "PackBot", University of Minnesota's "Scout" family of launchable robots, and MIT manipulator arms for the NASA/JPL Pathfinder and Surveyor Mars missions. This durability would expand the type of experimental tasks that can be reasonably attempted and speed implementation due to the reduced need for careful validation of programs.

Unintended contact that often occurs in unstructured grasping tasks can result in large contact forces unless the gripper is compliant. This contact can occur due to sensing uncertainty in unstructured environments, but can also happen in laboratory experiments, particularly in the debugging phase. Researchers are often reluctant to risk crashes with expensive multi-degree-of-freedom robot hands, so implementations must be carefully validated and experimental scope must be limited.

Compliance conveys two key advantages for robotic grasping: adaptability and robustness. The present invention takes advantage of the adaptability inherent with compliance and enhances it by incorporating further adaptability in the form of underactuation. An underactuated hand has fewer actuators than degrees of freedom, and therefore demonstrates adaptive behavior. In these hands, the transmission design allows motion of other joints to continue after contact occurs on a coupled link, allowing the hand to passively adapt to the object shape during finger closure.

Additionally, many complicated robotic hands suffer from drawbacks of being unreliable and difficult to use. Many simpler robotic hands suffer from a drawback of being aesthetically unappealing. The present invention provides a reliable robotic hand that is relatively simple to use and may be implemented with a molding process that may produce aesthetically acceptable appearance.

SUMMARY OF THE INVENTION

The present invention is a compliant, robust, adaptive mechanical grasping system. The compliance of the fingers is in parallel with the actuator elements, e.g., tendons running in parallel with the compliance. When the grasper or hand is used for exploring, the actuation elements are slack or uncoupled to the fingers and thereby do not interfere with or reduce the compliance. When the actuation members are actuated or pulled, the compliance is reduced thereby stiffening the finger or fingers. This property is desirable since compliance is helpful during acquisition of target objects, but less desirable during grasp since it reduces grasp stability. Another important aspect of the present invention is that the fingers of grasping system are also compliant in the direction normal to the plane of motion of the finger when actuated, allowing the fingers to passively comply to target objects and environmental constraints in this direction, as well as reduce the likelihood of damage to the invention when unplanned contact occurs. Additionally, the underactuated nature of the grasping system was designed to demonstrate an adaptability to a wide range of target object properties. This adaptability allows for extremely simple actuation and control of the hand, enabling robust grasping with even a single actuator and purely feed-forward control. The system is also scalable and may comprise flexural elements such that is may be scaled down to very small sizes such as by using MEMS fabrication processes.

In a preferred embodiment, the invention is a robust four-fingered grasper built using Shape Deposition Manufacturing (SDM). This process uses polymeric materials to simultaneously create the rigid links and compliant joints of the gripper, with embedded sensing and actuation components. In addition to simplifying the construction process, the result is an extremely robust gripper, fully functional after impacts and other large loads due to unintended contact. Other established manufacturing processes such as multi-shot injection molding, overmolding, or insert molding may also be used to create an embodiment of the invention with similar properties.

In a preferred embodiment, the present invention is a compliant underactuated grasper that comprises a base and a plurality of fingers. At least one of said plurality of fingers comprises a link, a joint complaint in a direction and connecting the link to the base, and a member for moving the link. The member acts in parallel to a direction of compliance of said joint such that actuation of the member substantially changes the compliance of the joint in the direction. The member may comprise a tendon cable. The invention may further comprise an actuator, for example a DC motor, for activating the tendon cable. The joint may have a viscoelastic response to provide damping. The compliant underactuated grasper may further comprise a sensor for sensing a position of said joint. Each finger may have more than one link, such that one link forms the base for another. A plurality of sensors may be mounted on or under the surface of the fingers to sense contact.

In another embodiment, the compliant underactuated grasper of the present invention further comprises a second link and a second joint connecting the second link to the first link and the second joint is compliant in the direction. Movement of the member substantially changes the compliance of the second joint in the direction. The second link may comprise a proximal link of the finger.

In still another embodiment, the present invention is a compliant underactuated grasper that comprises a base and a plurality of fingers. One or more fingers comprise a first link, a second link, a first joint connecting the first link to the second link, a second joint connecting said second link to said base, and a tendon cable for moving the first and second links. The first joint being is compliant in a first direction and the second joint being compliant in a second direction. The tendon cable is in parallel to the first direction of compliance such that movement of the tendon cable substantially changes the compliance of the first joint in the first direction. The first direction and second direction may be substantially the same. Further, the grasper may comprise an artificial hand.

In another embodiment, the present invention is a compliant underactuated grasper that comprises a base and a plurality of fingers. At least one of the plurality of fingers comprises a link, a joint connecting the link to the base with the joint being compliant in at least two directions, and a member for moving the link. The member for moving the link acts in parallel to a direction of compliance of the joint such that actuation of the member substantially changes the compliance of the joint in the direction. The grasper may further comprise a plurality of sensors.

In yet another embodiment, the present invention is a compliant underactuated grasper that comprises a base, a plurality of links, a joint between the base and each of the plurality of links wherein the joints are compliant in one and/or two directions, and an adaptive transmission that allows some links to keep moving after others have made contact with the object. The grasper may further comprise a plurality of viscoelastic joints.

In another embodiment, the present invention is a method for making underactuated graspers with polymer structures so that actuation and/or sensing components are embedded within the polymer material.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which:

FIG. 11 shows the range of finger postures that can be expressed as combinations of two characteristic configurations or eigengrasps.

DETAILED DESCRIPTION OF THE PREFERRED EMBODIMENTS

Figure 1:
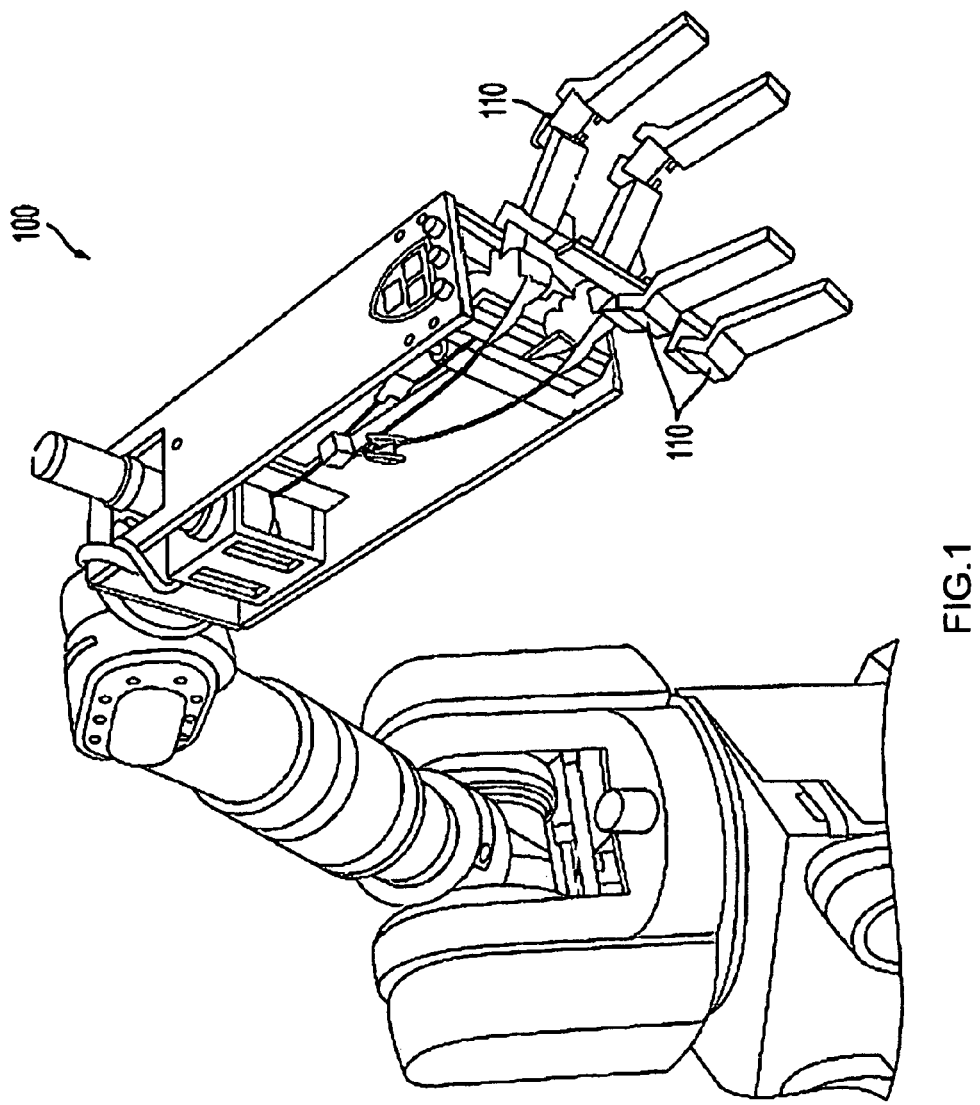
FIG. 1 is a diagram of a four-fingered, underactuated SDM hand in accordance with a preferred embodiment of the present invention mounted on a Whole-Arm Manipulator (Barret Technology Inc., Cambridge, Mass.).

To provide both adapatability and robustness, a four-fingered hand 100, shown in FIG. 1 mounted on a Whole-Arm Manipulator 102, features passively compliant joints 110. The exemplary hand 100 was fabricated using polymer-based Shape Deposition Manufacturing (SDM). SDM is an emerging layered manufacturing technique with which the rigid links and compliant joints of the gripper are created simultaneously, with embedded sensing and actuation components. Elastomeric flexures create compliant joints, eliminating metal bearings, and tough rigid polymers fully encase the embedded components, eliminating the need for seams and fasteners that are often the source of mechanical failure.

A preferred embodiment of a compliant finger in accordance with a preferred embodiment of the invention is described with reference to FIG. 2. Each finger 200 has a distal link 210 and a proximal link 220. The concave side of each link 210, 220 contains a soft fingerpad 212, 214 to maximize friction and contact area, thereby increasing grasp stability. See K. B. Shimoga, A. A. Goldenberg, "Soft materials for robotic fingers," *Proceedings of the 1992 IEEE International Conference on Robotics and Automation*, pp. 1300-1305, 1992 and M. R. Cutkosky, J. M. Jourdain, P. K. Wright, "Skin materials for robotic fingers," *Proceedings of the 1987 IEEE International Conference on Robotics and Automation*, pp. 1649-1654, 1987. Links 210, 220 are connected via elastomer joint flexures 232, designed to be compliant in the plane of finger motion and stiffer out of plane. Each joint 230 in the preferred embodiment has a compliant elastomer joint flexure 232, a magnet 234, a hall-effect sensor 236 and a connector 238. The finger of this embodiment further has a tendon cable 240 running through a hollow cable raceway 266. There is a compliant joint 246 between link 220 and a dovetail connector 248 having a magnet 264 connected thereto. It further has a connector 260 and a Hall-effect sensor 262. FIG. 3 shows the behavior of the distal finger joint 230 through its range of motion.

Figure 4:
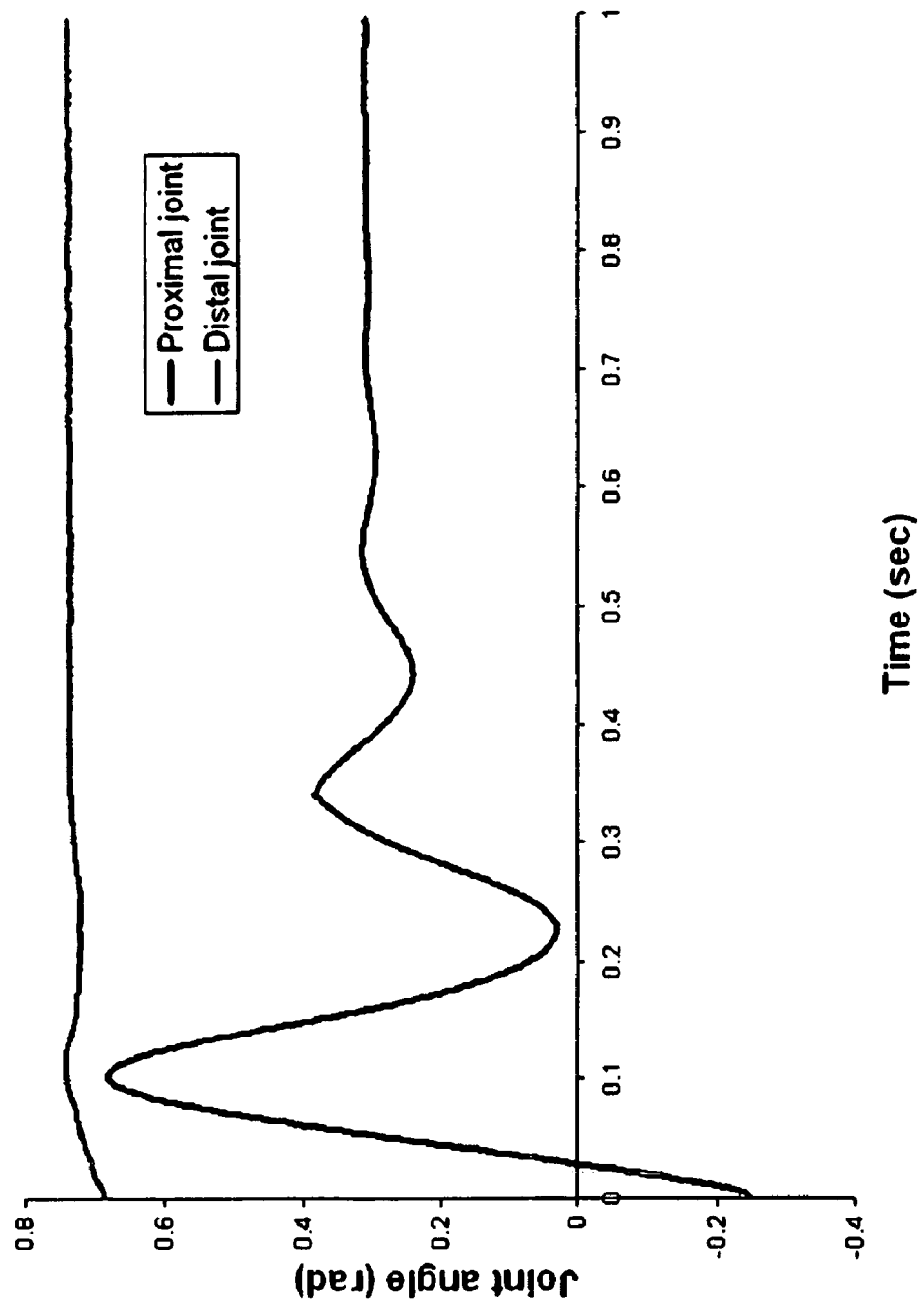
FIG. 4 is a graph showing for a finger in accordance with a preferred embodiment of the present invention joint response to a tip step displacement released at time=0.

In this preferred embodiment of the invention, the polyurethane used for these joints demonstrates significant viscoelastic behavior, which reduces joint oscillations and permits the use of low joint stiffness. FIG. 4 shows the joint response of the finger of this preferred embodiment to a large step displacement of the fingertip, released at time t=0. Note that the oscillations are negligible after less than 1 second. In a conventionally-fabricated grasper with metal springs, oscillations due to large step displacements were found to persist for tens of seconds after release.

In an exemplary embodiment of the invention, the two links 210, 220 of each finger are 70 mm (measured from the center of the joint flexures), with a total hand aperture of 113 mm. Due to the molding process used to create them, the SDM fingers, with embedded sensors and actuation components, are a single part weighing 39 grams, with no fasteners or adhesives. These measurements of the links 210, 220 are exemplary only and it will be apparent to those of skill in the art that many variations in link size and shape, and well as the process to create them, are possible with the present invention.

Figure 5:
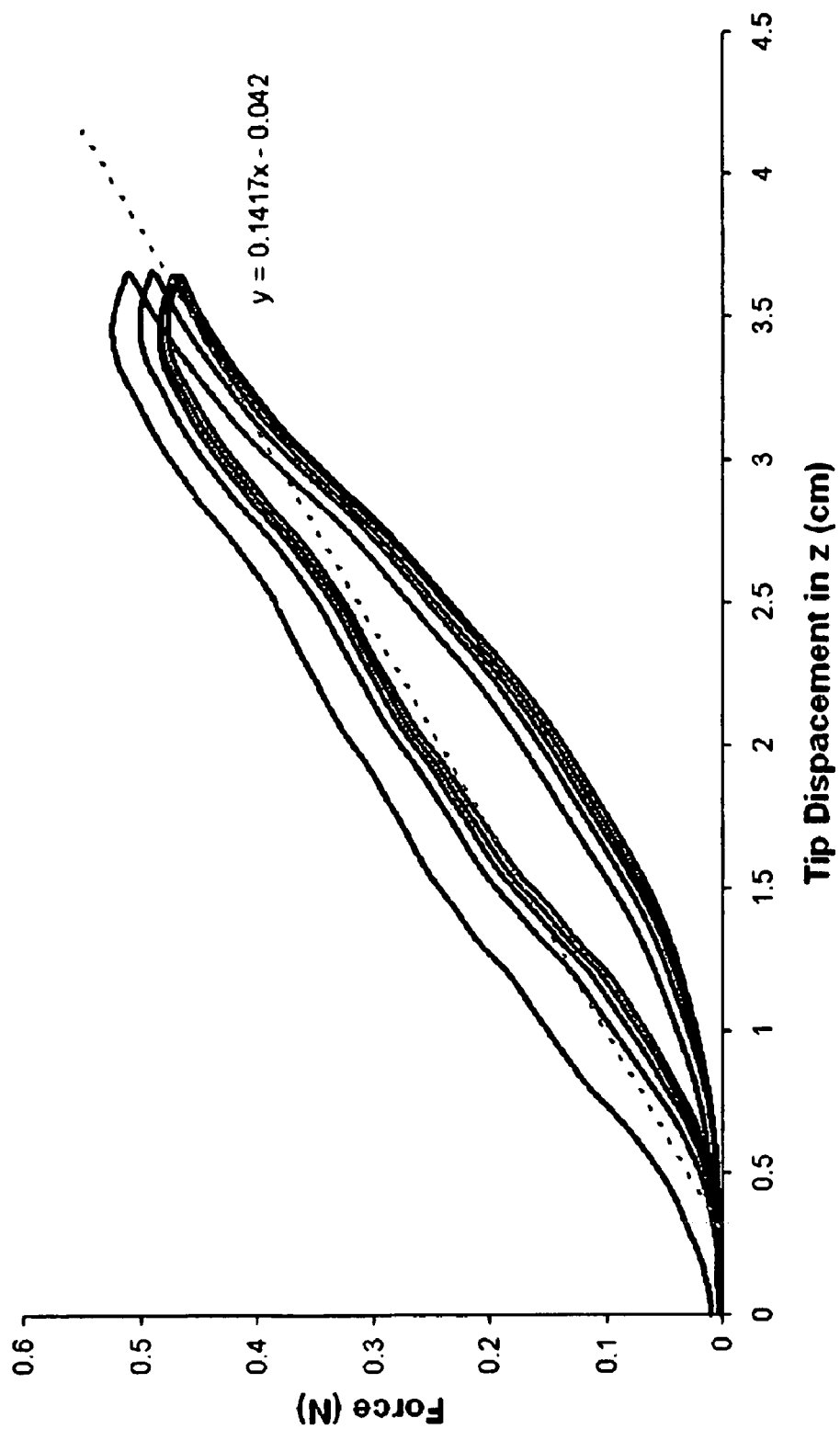
FIG. 5 is a graph of a force-deflection curve of a tip of a finger of a preferred embodiment of the present invention with a linear trend line.

FIG. 5 shows the force generated at the tip of the fingers due to displacement in the out-of-plane direction. The tip was displaced at a rate of approximately 1 cm/sec while mounted on an actuated linear slide mechanism, with force measured by a multi-axis force/torque sensor. This data represents force generated due to motion of the tip across the tested range and back for a total of five cycles, low-pass filtered with a cut-off frequency of 1 Hz, to remove sensor noise. Note the hysteresis in the curves and the force relaxation due to viscoelasticity.

This result shows that the SDM fingers, while exhibiting very low tip stiffness, can also undergo large deflections while remaining completely functional. In the test shown in FIG. 5, the tip was displaced more than 3.5 cm in the out-of-plane direction (approximately 20 degrees) without any degradation of mechanical properties. The advantages of this property are clear when considering the usual result of unplanned contact during use of traditional research robotic hands.

To give a sense of the robustness of the mechanism to impacts and other potentially harmful loads, a number of more informal tests were performed. An SDM finger was repeatedly dropped from a height of over 15 m onto a stone floor, without significant damage. The fully-assembled hand has been hit repeatedly with a hammer, fingers jammed against objects, and even used underwater, without degradation of performance.

The preshape and stiffness characteristics of the hand were determined based on the results of an optimization study. See A. M. Dollar and R. D. Howe, "Towards grasping in unstructured environments: Grasper compliance and configuration optimization," Advanced Robotics, vol. 19 (5), pp. 523-544, 2005. In this simulation, the joint rest angles and joint stiffness ratio of the fingers were varied and the performance analyzed to maximize the allowable uncertainty in object location (successful grasp range) and size as well as minimize contact forces.

The grasping model combined the inverse kinematics of the mechanism, torque balances for each joint, work balance, and equations describing the geometry of the grasper and object. MATLAB (The Mathworks, Natick, Mass., USA) was used to numerically solve these systems of equations and allow for the performance of the grasper to be simulated over a wide range of variations in grasper parameters.

In order to reduce the parameter space and allow for detailed analysis of parametric trade-offs, a simplified version of our hand was examined: a planar, two-fingered, four jointed gripper with links that are rigid lines between compliant rotational joints. The object to be grasped was assumed to be circular (a frequent assumption in the grasping literature, and a reasonable approximation for many objects), and sufficiently massive such that the gripper contact forces do not displace or rotate it. We ignored inertial effects and assumed quasi-static conditions.

Based on the results of this study, the preshape configuration $\phi_1=25°$ (angle with the horizontal in FIG. 6) and $\phi_2=45°$ (angle with the proximal link) was chosen for the preferred embodiment of the finger design. In addition, the results showed that the proximal joint should be much stiffer than the distal joint, keeping the grasping surface concave and contact forces low. These angles and stiffnesses were shown to enable grasping of the widest range of object sizes with the greatest amount of uncertainty in object position, while also exhibiting low average contact force, reducing the likelihood of displacing or damaging the object. Additionally, these results were confirmed experimentally by testing the performance of a reconfigurable aluminum grasper as joint rest angles and stiffnesses were varied.

Figure 2:
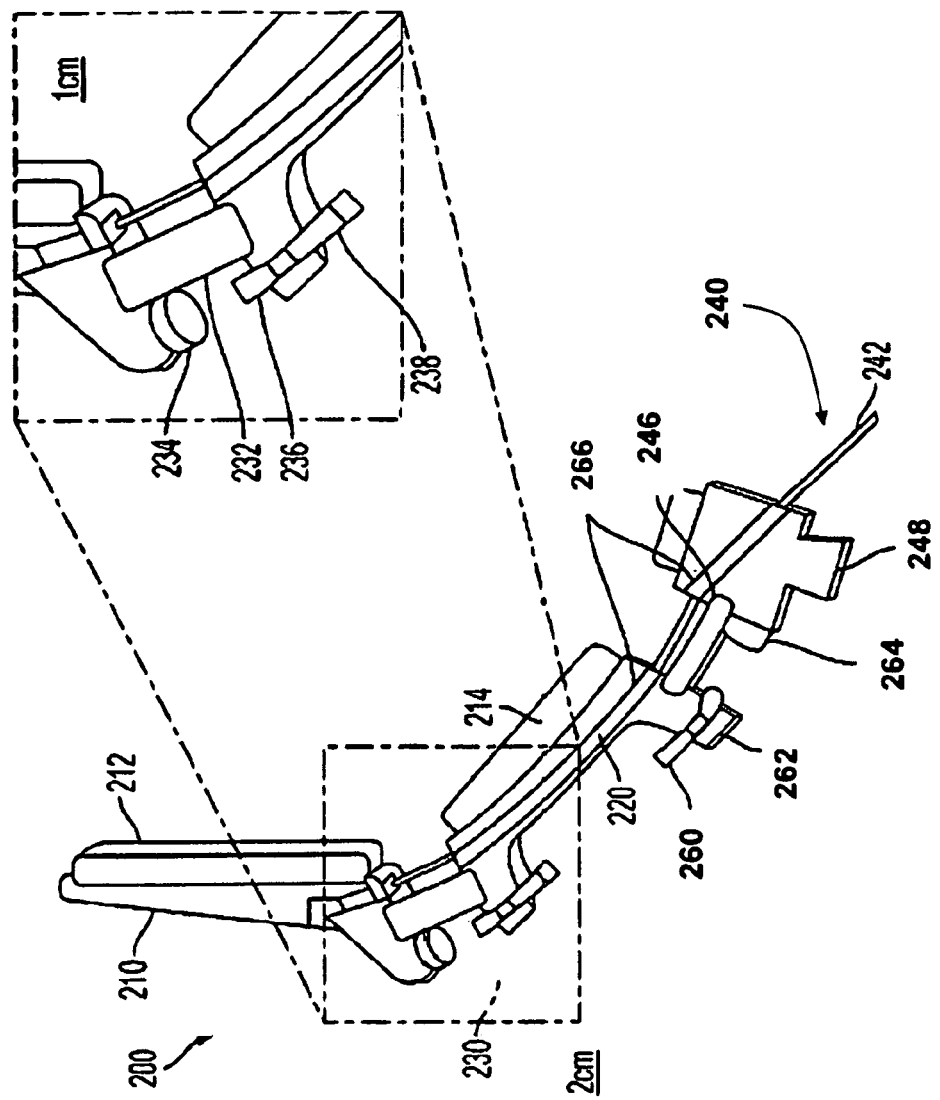
FIG. 2 is a diagram of a robotic finger in accordance with a preferred embodiment of the present invention.
Figure 3:
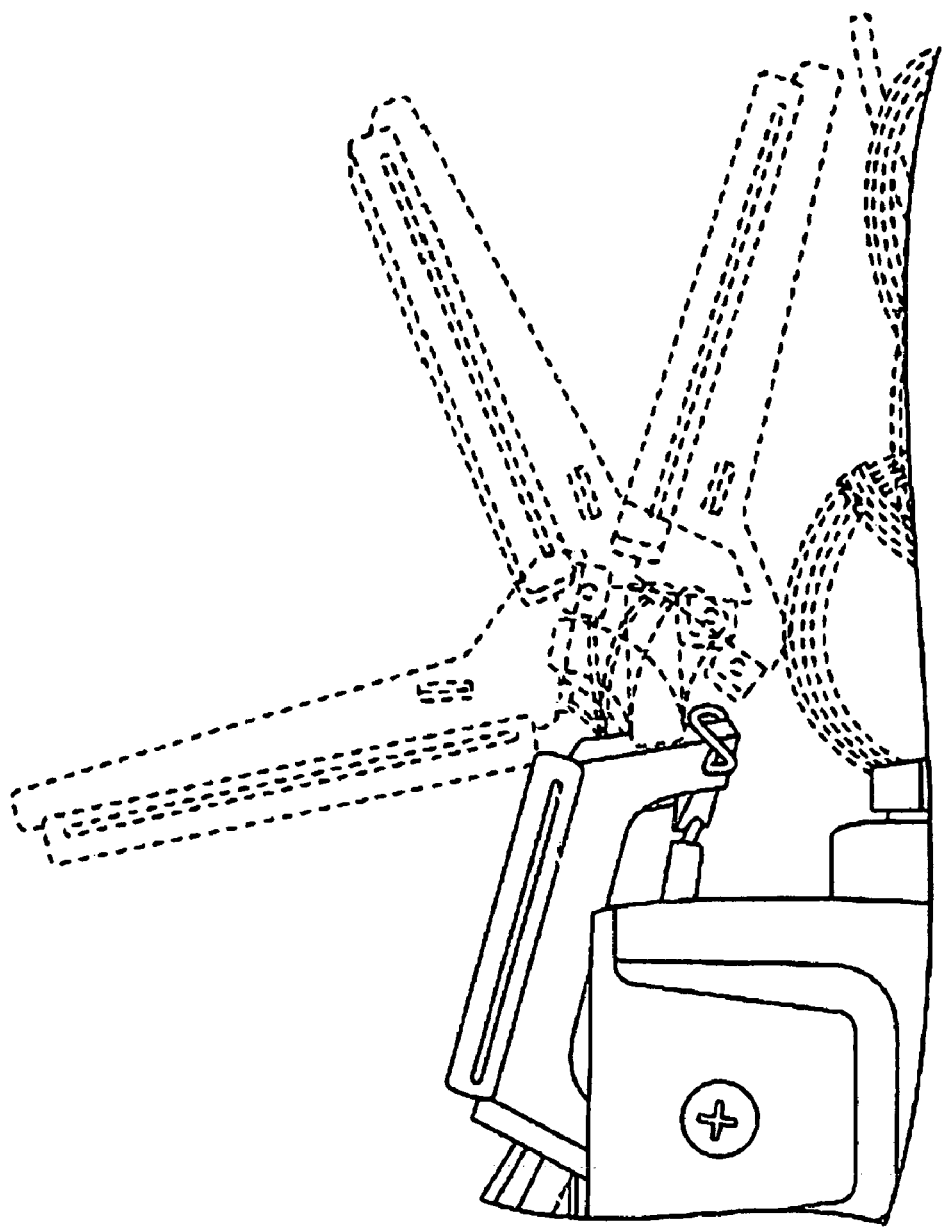
FIG. 3 is a diagram showing joint deflection and link motion for three positions of travel across a travel range of a distal joint of a finger in accordance with a preferred embodiment of the present invention.

For actuation, each finger has a pre-stretched, nylon-coated stainless steel cable 240 anchored into the distal link 210, and running through low-friction nylon 11 tubing 242 to the base (FIG. 2). The grasper is unactuated until contact is made with the target object and a successful grasp is predicted based on the available sensory information. Before actuation, the tendon cable 240, which is in parallel with the compliant joints 230, remains slack and the finger is in its most compliant state. This method permits the use of actuators that are not backdrivable and prevents the inertial load of the actuator from increasing the passive stiffness. After actuation, the stiff tendon takes much of the compliance out of the fingers, resulting in a stiffer grasp with greater stability.

Figure 6:
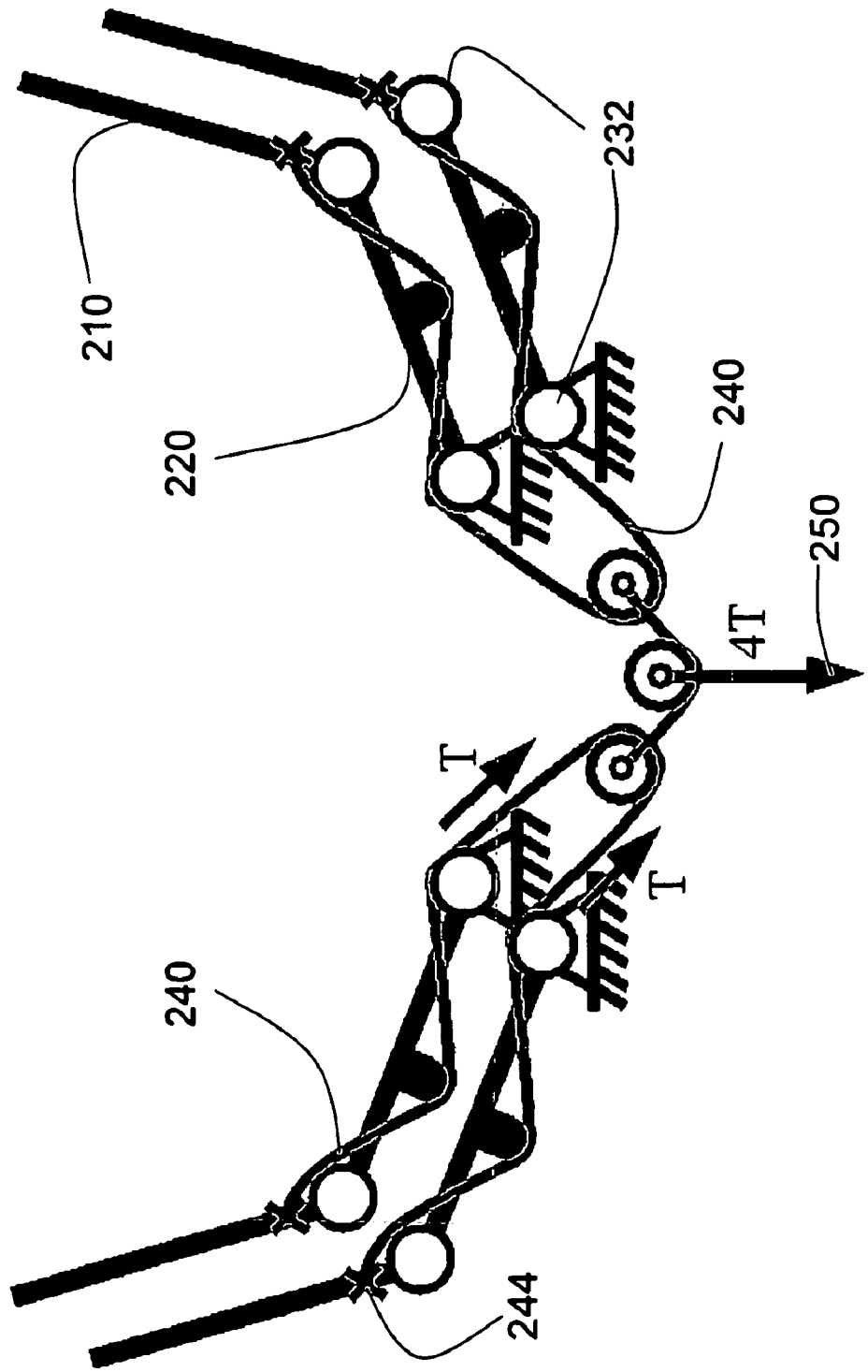
FIG. 6 is an actuation schematic diagram of a hand in accordance with a preferred embodiment of the present invention.

In a preferred embodiment, a single actuator drives the four fingers (eight joints 232) of the hand. Each finger has links 210, 220. This property not only makes the gripper simpler and lighter, but it also allows the gripper to be self-adapting to the target object. FIG. 6 details the actuation scheme, by which motion of the distal links 210 can continue after contact on the coupled proximal links 220 occurs, allowing the finger to passively adapt to the object shape. Additionally, the pulley design in this scheme allows the remaining fingers to continue to enclose the object after the other fingers have been immobilized by contact, ensuring that an equal amount of tension T is exerted on each tendon cable 240, regardless of finger position or contact state. This adaptive transmission behavior or force balancing behavior can be alternately embodied by a combination of levers pivoted about the attachment of the tendon connected to the motor.

The four fingers in this embodiment are staggered in the out-of-plane direction on the palm to allow them to completely close without interfering with one another. In this simulation, the joint coupling scheme (ratio of torque applied at the distal/proximal joints divided by the stiffness ratio of the joints) was varied in order to maximize the allowable uncertainty in object location (successful grasp range) and size as well as minimize contact forces. The simulation approach followed the kinematics and stiffness study described above.

To keep unbalanced object forces low, the torque ratio (ratio of torques applied at the distal and proximal joints) should be as large as possible. However, as the torque ratio increases, the position range in which an object can be successfully grasped (maximum allowable positioning error) is decreased. This tradeoff in force versus successful grasp range can be weighed by considering the quality of the sensory information available for the grasping task. For a task in which the location of the target object can be accurately sensed, the torque ratio can be large, since the gripper can be reliably centered on the object. However, for tasks in which sensory information is poor, the positioning of the gripper is subject to large errors, requiring that the chosen torque ratio should allow for large positioning errors. Since our hand is intended for grasping in unstructured environments resulting in large expected positioning errors, we chose a lower torque ratio $((\tau_2/\tau_1)/(k_2/k_1)=0.6)$. See A. M. Dollar and R. D. Howe, "Joint Coupling Design of Underactuated Grippers," Proceedings the 30th Annual ASME Mechanisms and Robotics Conference, 2006 International Design Engineering Technical Conferences (IDETC), Philadelphia, Pa., Sep. 10-13, 2006.

While the embodiment described above has the ability to grasp objects in unstructured environments, the range of graspable objects and grasp configurations is limited: only "power grasps" of objects larger than a few cm are possible. This embodiment has only a single "wide open" hand posture and is not capable of precision grasps because the finger tips do not meet. To add functionality, the hand design may be augmented with one or more additional actuators to actively change the rest positions of the fingers to smaller apertures that more closely approximates the size of small objects. One particularly effective means for implementing this ability is to move the finger rest positions to create postures that duplicate the dominant modes of finger motion in human grasp preshaping. See M. Santello, M. Flanders, and J. F. Soechting. Postural hand synergies for tool use. Journal of Neuroscience, 18(23):10105-10115, 1998. For example, through the use of two motors, the fingers can be moved as a combination of two principal components that capture much of the variability of human hand preshaping in anticipation of grasping a wide variety of objects, such as is shown in FIG. 11.

One reason this approach improves performance is because it allows the fingers to converge on the object before the joint actuation begins. The tendons in the fingers are in parallel with the joint springs, so once the tendons are actuated to close around a small object the fingers become stiffer and large contact forces can result. (This transition to stiff fingers is beneficial in achieving a stable grasp with good disturbance rejection, but should occur only after fingers are correctly positioned around the object. To allow the hand to effectively grasp a wider range of objects we need to actively change the rest positions of the fingers to smaller apertures that more closely approximate the object size. The actuation system to move the finger rest positions can be distinct from the motor that controls the finger closing via cable tendons: its goal is to change the orientation of the fingers with respect to each other and the palm while keeping the fingers compliant, before the finger closing actuation of the tendons makes them stiff. In other embodiments, it is possible to use a single motor that moves the finger rest positions in the first range of actuator movement, then close the finger joints in the succeeding stages.

Joint angle sensing in the robot fingers described above may, for example, be accomplished by embedding a low output impedance linear hall-effect sensor 236 (A3517SUA, Allegro MicroSystems, Inc., Worcester, Mass., USA) on one side of the joint, and a rare-earth magnet 234 (6.35 mm diam×3.18 mm, NdFeB, 10,800 Gauss strength, K&D Magnetics, Inc., Boca Raton, Fla., USA) on the other side. Joint motion changes the distance between the two, varying the sensor output. The sensors 236 are wired to exposed connectors 238 (2.5 mm PC board header) for connection to external cables. These sensors give sufficient sensitivity across the entire range of motion of the joints to allow for use in the control of the grasper. The RMS sensor noise was found to be approximately 40 mV. Note that the sensor gives better resolution as the finger opens (θ decreases) in order to optimize sensitivity during passive contact under. This enhances performance of the grasper when used as a "feeler".

In order to determine the effectiveness of the hand at grasping objects in unstructured conditions, we experimentally evaluated the ability of the hand to grasp three-dimensional objects in a three-dimensional environment with significant errors in the sensed target object location and a very simple control scheme. Specifically, we examine the amount of positioning error allowable in order to obtain a stable grasp on the object, and record the forces on the object during the grasping task.

EXAMPLE 1

The SDM Hand was mounted on a low-impedance robotic arm (Whole-Arm Manipulator (WAM), Barrett Technology, Cambridge, Mass., USA) for positioning (FIG. 1). Only three of the four joints of the WAM were used for a total of three positioning degrees of freedom: the base roll, shoulder pitch, and elbow pitch. Since there is no wrist, orientation of the hand was not controlled and was determined based on the kinematics of the manipulator at the target position.

The WAM was controlled using a 1000 Hz servo loop running on a DSP co-processor board (DS1103 PPC, dSPACE Inc., Novi, Mich.). The desired position was achieved using a PID controller with gains chosen so that the overall stiffness was dominated by the remote environment stiffness. To increase performance and allow for the use of lower gains, the robot controller uses a feedforward model of the forces on the arm (before contact with the object), including compensation for torque ripple, gravity, and friction.

Target objects were mounted on a 6-axis force/torque sensor with a resolution of 0.1N (Gamma model, ATI Industrial Automation, Inc, Apex, N.C., USA). Objects were mounted to the force sensor via a square peg, such that position and orientation in the plane were fixed, yet the object could be lifted up out of the mount after grasping. Only contact forces in the plane of the workspace table were recorded, and torques were ignored. Robot inertial effects were minimized by using low accelerations during motion, reducing the task to nearly quasi-static conditions.

Two objects were tested at three positions, for a total of six conditions. The objects were a cylindrical PVC tube with a radius of 24 mm (0.3 times the grasper link length l), and a wooden block with a 84 mm×84 mm cross section (equivalent to 0.75 times the grasper link length l). This block was oriented such that a flat side was approximately normal to the approach direction. The difference in object position served to change the approach angle of the grasper with respect to the long axis of the objects, ranging from 25.6° to 42.8°.

The experiment begins by manually finding the 'zero position' for the particular object and location. This position was taken as the point at which the hand contacts the object without any deflection, centered on the object; this represents the positioning of the hand under perfect visual sensing (hand is centered on the object) and perfect contact sensing (stopping the manipulator at the instant of initial contact). They direction was taken along the line lying between the robot origin and the center of the object, normal to the direction of gravity. The x direction is normal to the y direction, also normal to the direction of gravity (the z direction).

In order to examine the behavior of the grasping system for a range of "error" in positioning, a grid of positions from the zero position was calculated. The performance of the hand was tested at 10 mm increments from the zero position in the positive x (symmetry in the positive and negative x direction was assumed) and positive and negative y directions (grasping behavior is not symmetric in y).

The manipulator joint angles were calculated using the inverse kinematics of the robot and rounded to the nearest tenth of a degree. For each position on the grid, the robot moves to within a tenth of a degree of the target joint configuration at each joint. The robot then initiates the grasp by driving the grasping motor to a preset torque (stall) and thus closing all fingers. When an encoder indicates motor stall, the motor current is reduced to a small amount required to prevent backdriving of the motor due to the tendon force. The arm then attempts to lift the object vertically out of the force sensor mount. Forces on the object and whether the grasp was successful were recorded for each position. The vertical position of the hand was kept constant across object position at approximately 19 cm above the table. The sensors on the hand are not used in this study. This simple, strictly feedforward hand control mode is used to evaluate the benefits of the optimized passive compliance and adaptive coupling approach to hand design.

Each location on the (x,y) grid of positions was tested three times, and the force results averaged. Force was recorded at 1000 Hz during the experiment. Data from the force sensor was filtered by taking the median of the previous 20 force samples (0.02 s).

A grasp was deemed successful if the object was lifted vertically out of the force sensor mount a distance of 150 mm, and the grasp appeared to be stable (i.e. no slippage of the object was visually observed). Grasps could fail at a given position for a number of reasons: passive contact force pushes the object out of the sensor mount or pushes the sensor out of the table mount, too few fingers make contact with the object, or an imbalance of forces on the object due to undesirable positioning leads to it being ejected from the grasp.

Figure 7:
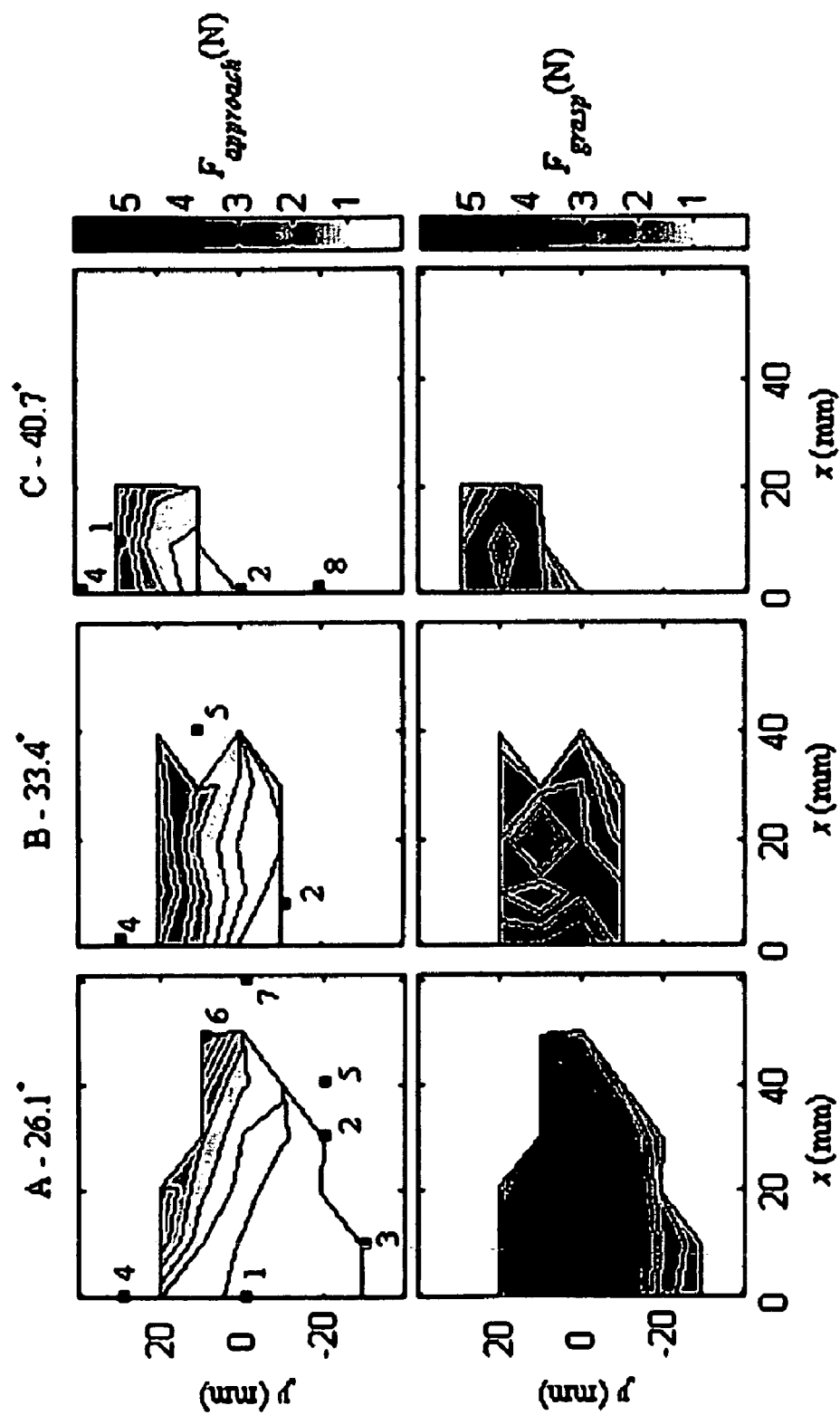
FIG. 7 is a series of graphs showing forces on a PVC cylinder in an example of the present invention.
Figure 8:
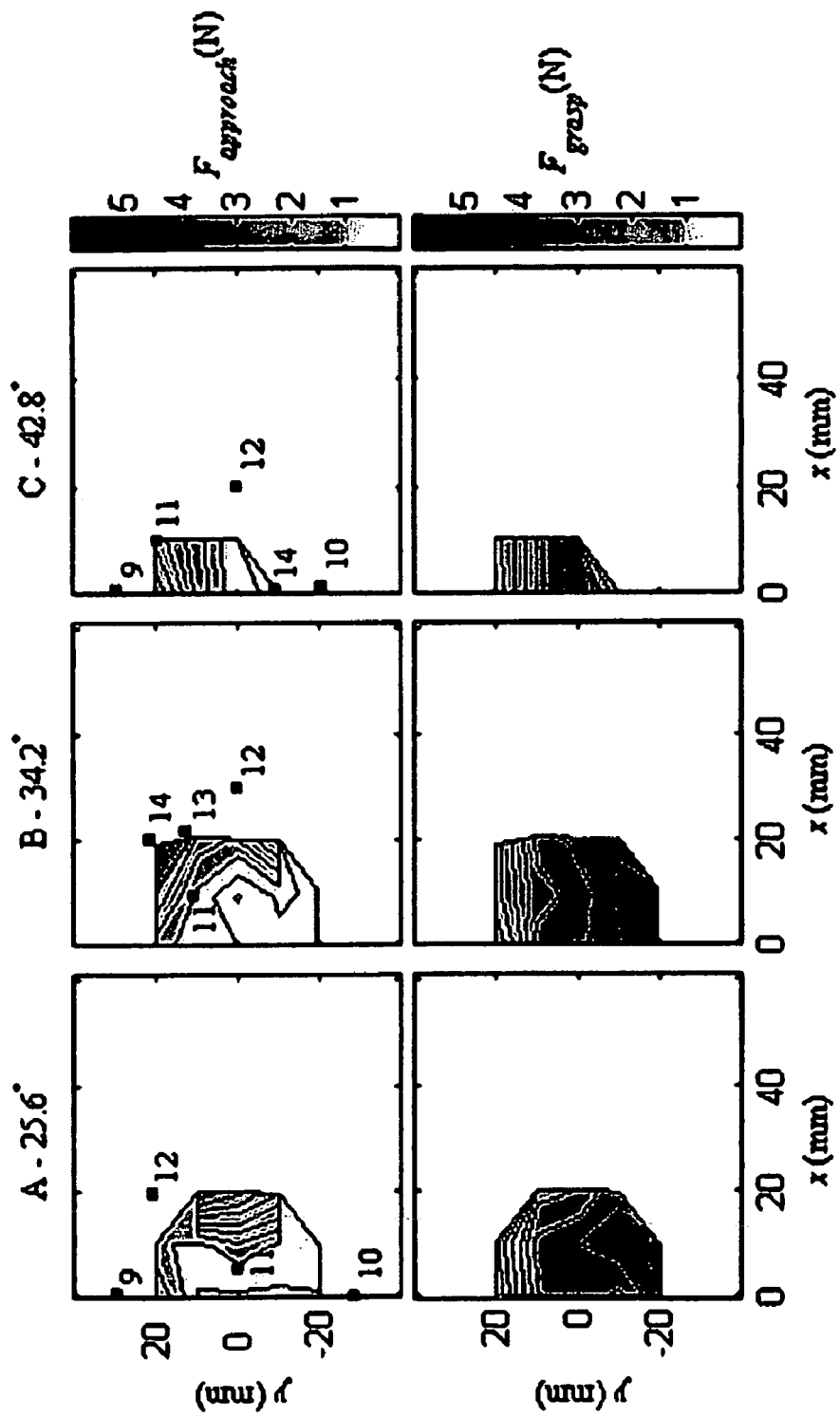
FIG. 8 is a series of graphs showing forces on a wood block in an example of the present invention.

FIGS. 7 and 8 show the results of the force and successful grasp space study for the two objects at three configurations each. The left column ($F_{approach}$) indicates the magnitude of the maximum force applied to the object during the approach phase of the grasp (hand has not yet been actuated). The right column ($F_{grasp}$) indicates the magnitude of the maximum force applied to the object during the grasp phase (fingers are closing in on the object, before motion of the arm to lift the object out of the sensor mount).

The various points on the plots that are labeled correspond to interesting or demonstrative configurations. A description of the grasping behavior at these points is given in Tables I and II.

TABLE I

| # | CYLINDRICAL OBJECT Grasp behavior |
|---|---|
| 1 | Four-fingered grasp |
| 2 | Three-fingered grasp |
| 3 | Two-fingered grasp |
| 4 | Object knocked from mount due to palm hitting object |
| 5 | Object twists out of grasp |
| 6 | Left fingertip sticks, |

TABLE I-continued

CYLINDRICAL OBJECT

| # | Grasp behavior |
|---|---|
|  | then slides into place |
| 7 | Miss object completely |
| 8 | Two fingers make contact - no grasp |

TABLE II

RECTANGULAR BLOCK

| # | Grasp behavior |
|---|---|
| 9 | Object knocked from mount due to palm hitting object |
| 10 | Two fingers make contact - no grasp |
| 11 | Four-fingered grasp |
| 12 | Object knocked from mount due to finger jamming against object |
| 13 | Left fingertip sticks, then slides into place |
| 14 | Three-fingered grasp |

The boundary of these plots is a rough approximation of the successful grasp range (the amount of allowable positioning error resulting in a successful grasp) for the particular object and position. Note that the successful grasp range is significantly affected by the approach angle of the hand. The steeper the approach angle, the less likely enough fingers will be in contact with the object to create a stable grasp.

The results show that the PVC cylinder (48 mm diameter) could be successfully grasped at positions up to 50 mm from the center in x, and +20 mm, −30 mm in y, for a total allowable positioning error of over 100% of the object size in each direction. Shallow (more horizontal) hand orientations lead to larger successful grasp ranges. For the wooden block (84 mm×84 mm cross section), positioning errors of up to 20 mm from the center in x, and ±20 mm in y resulted in a successful grasp, for a total allowable positioning error of over 45% of the object size.

In general, the shape and orientation of these objects lend themselves better to a shallow or horizontal hand orientation, aligning the axis of the power grasp configuration with the major axis of the object. For this reason, additional manipulator or wrist degrees of freedom can greatly expand the amount of allowable positioning uncertainty across the manipulator workspace, particularly if the orientation of the major axis of the object can be estimated.

It can be seen from the contours that, in general, $F_{approach}$ increases with increasing y. This is expected since motion forward increases the passive deflection of the joints due to contact, increasing the force. With decreasing y, the force goes to zero, as passive contact with the object is lost. The apparent discrepancy with this trend seen in FIG. 8A, is simply an artifact of the sampling and contour generation.

As x increases, $F_{approach}$ increases as well. This is particularly significant in the wooden block cases, where the forward-most finger first "jams" against the face of the block, eventually slipping to the side, enabling a successful grasp. As x increases, the amount of "slip" of this finger necessary for a successful grasp increases, thereby increasing the passive force. Note that, as in this example, the maximum passive force often occurs before the hand has reached the target position.

The trends in the $F_{grasp}$ plots can be largely explained in terms of the object size relative to the fingers. For each object there is some "grasp equilibrium" position, located approximately with the object centered in the closed hand in they direction, where the forces on the object would balance even without friction. Since the zero position for each object was based on the location of the front of the object and not the center, the size of the object affects the grasp equilibrium position. This position is in negative y for smaller objects (i.e. the object is "too close" to the base of the hand at the zero position) and positive y for larger objects (i.e. object is "too far" from the base at the zero position). In general, positions far away from the equilibrium position will result in high forces.

Figure 9A:
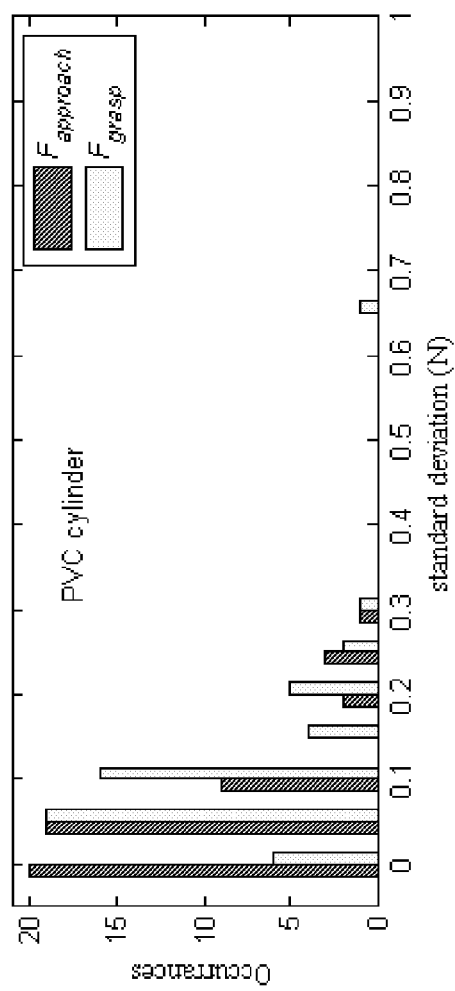
FIGS. 9(a) and (b) are histograms of the standard deviation of force measurements for the PVC cylinder and wood block of the examples of the present invention.
Figure 9B:
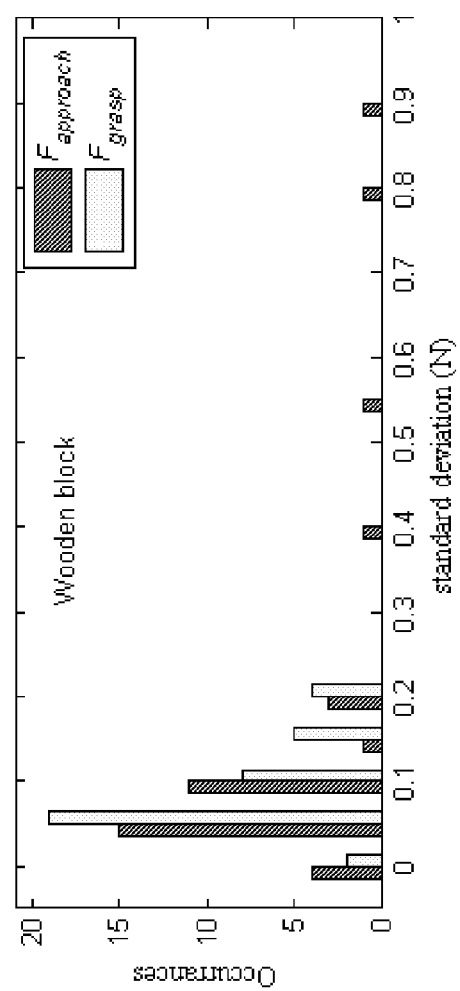

FIG. 9 shows histograms of the standard deviation of the force measurements (three samples at each configuration) for the two objects. Note that the total number of samples is different for the two objects: 38 for the wooden block and 54 for the PVC cylinder. While the values of standard deviation are typically less than the sensor resolution (0.1N), there are a number of instances of large variation in the force measurements between trials, particularly during the approach phase for the wooden block. These instances occur at positions close to transition points between general grasp behaviors. For instance, when grasping the wooden block, if the tip of a finger is very close to one of the edges, slight changes in hand or robot configuration can lead to drastically different behaviors (jamming against the object face vs. gently slipping to the side).

EXAMPLE 2

In order to demonstrate a further level of autonomy, we conducted a grasping experiment in which the location and size of a spherical target object were extracted from a single image from an overhead camera and used to determine the target grasping position.

The details of the manipulator and hand are the same as used in the previous experiment. Again, the hand was used without a wrist, for a total of three positioning degrees of freedom, and no control of orientation.

To simplify the positioning of the robot, spherical target objects were chosen, spanning a wide range in size: a tennis ball (r=32 mm), softball (r=44 mm), small soccer ball (r=74 mm), and volleyball (r=105 mm). The tennis ball and volleyball are approximately the minimum and maximum size sphere that our hand can reliably grasp. The spheres were set on a small stand to prevent them from rolling away during the grasping procedure, but were not fixed to the table.

A total of twelve trials for each of the four objects were conducted. The objects were pseudo-randomly placed on the workspace table in a manner such that all regions of the workspace were covered over the twelve trials. Only one object was placed on the table per trial. The workspace table is positioned approximately 22 cm below the origin of the robot. As in the experiment presented in section III, variations in target object position result in different approach angles of the robot hand due to the absence of a wrist and only three positioning degrees of freedom. Objects closer to the base are approached from above, while objects far from the base are approached from the front.

The target configuration of the robot manipulator was determined based on a single overhead image of the workspace taken from a low-resolution USB camera (640×480 pixels, QuickCam Pro 3000, Logitech Inc., Fremont, Calif. USA). The camera was positioned at a height of 1.63 m above the workspace, viewing a 1.26 m×0.94 m portion of the workspace table. The lens distortion of the camera was accounted for by calibrating using a Matlab-based camera calibration toolbox. The calibration was achieved to a mean pixel error of 0.40, corresponding to 0.79 mm.

To register the camera to the robot workspace, a small black sphere was mounted to the end of the manipulator. The sphere was positioned within 3 cm (+−2 cm) of the workspace table with a total of 32 images were taken spanning the robot workspace. The two spaces were registered using a linear least-squares fit, with an RMS error of 1.98 mm. The mapping was found with a combination of the forward kinematics of the manipulator and the centroid of the sphere in the camera image. The resulting resolution of the camera is 1.97 mm/pixel of the workspace table.

During experimental trials, the target object was located in the RGB image by detecting the "colored" pixels. Pixels with a ratio of the red/green and red/blue channels between 0.9 and 1.1 were interpreted as 'gray', and part of either the table or robot.

A bounding box was fit to the "color" blobs, and the largest taken as the target object. The largest side of the target object box was taken as the object diameter (since the target objects are spherical). This value, in conjunction with knowledge of the height of the workspace table, was used to locate the center of the object normal to the table. The centroid of the object pixels was taken as the object location in the plane of the workspace table.

The commanded target grasping position was the point on the surface of the sphere at which the hand is centered on the object with the center of the hand just touching the object.

Once the target position is determined based on the camera image, the robot first moves to a position 15 cm away from the target, normal to the sphere. This "approach" point ensures a consistent "approach" phase on the object regardless of initial manipulator configuration, and that the hand makes contact with the target in a way that maximizes the likelihood of a successful grasp. After reaching the approach point, the robot then moves in to the object, initiating the grasp once the target position has been reached (within approximately one tenth of a degree in all joints). The arm then lifts the object upwards 15 cm, with the grasp deemed successful if the object appeared to be stable (i.e. no slippage of the object was visually observed).

Figure 10:
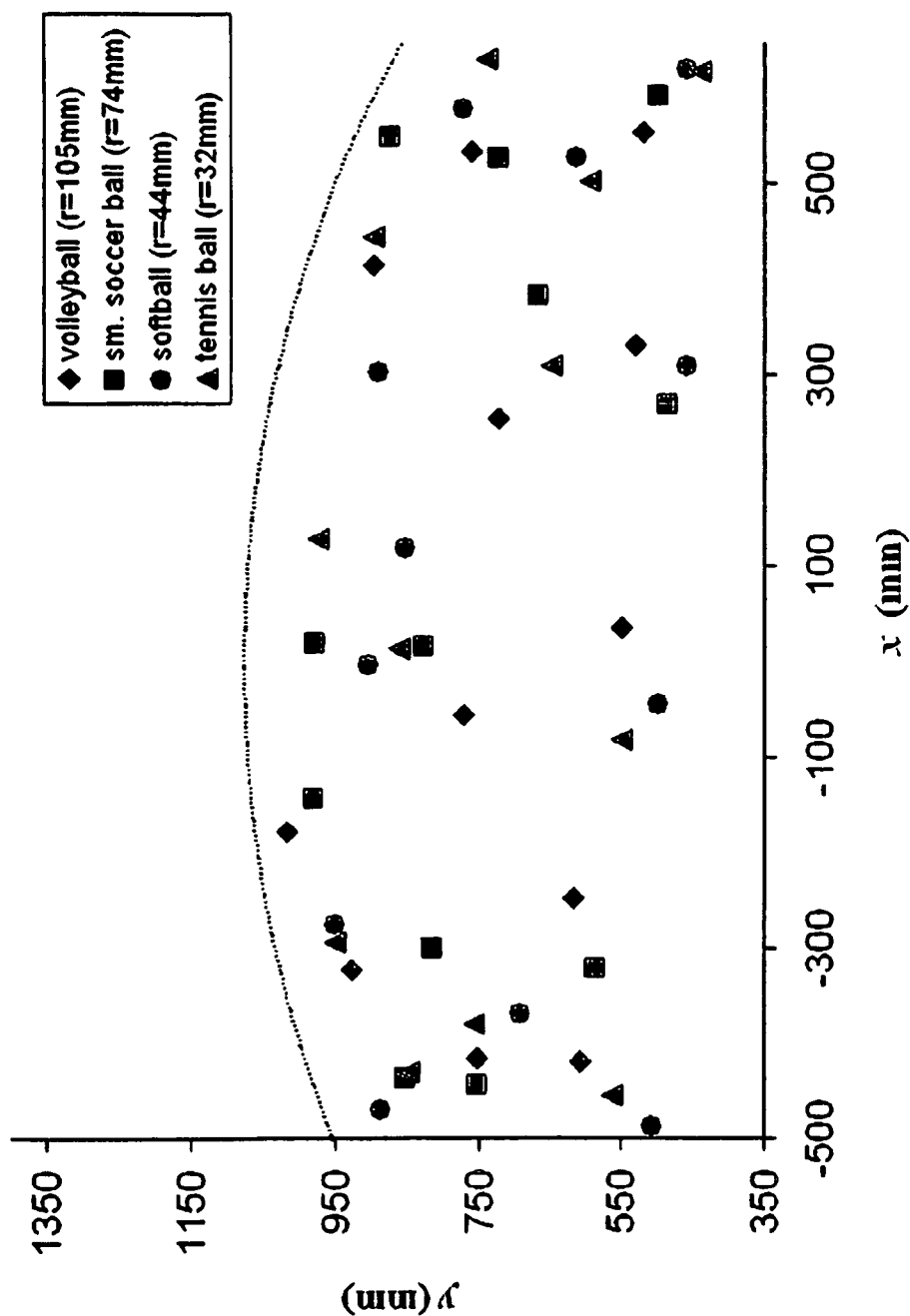
FIG. 10 shows the placement of the target objects in a workspace in connection with an experiment illustrating a preferred embodiment of the present invention.

The results show that the objects can be grasped every time over the entire workspace. FIG. 10 shows the placement of the target objects in the workspace. The axes correspond to the Cartesian robot space. The arc on the outer edge is the approximate limit of the robot workspace (i.e. arm fully extended) for the largest object (volleyball—r=105 mm). The data points are the center of the target object as extracted from the camera image. Larger objects therefore can be grasped further from the base than smaller objects by this classification, since the actual grasp target position is much closer than the object center. Similarly, smaller objects can be grasped closer to the base and further to the sides since the entire object is more likely to be in the image space of the camera.

TABLE III

OBJECT RADIUS MEASUREMENTS

| object | true r (mm) | est. r (mm) | error | std. dev |
|---|---|---|---|---|
| Volleyball | 105 | 116.3 | 11.3 | 2.1 |
| Sm. Soccer ball | 74 | 74.3 | 0.3 | 2.2 |
| Softball | 44 | 46.1 | 2.1 | 1.6 |
| Tennis ball | 32 | 34 | 2 | 1.3 |

As expected due to symmetry in the object, the rotation of the robot base joint does not affect the performance of the task. Radial position from the base also does not affect the ability to establish a successful grasp.

Since we do not know the "true" object position, it is difficult to estimate the amount of positioning error inherent for each trial. However, from visual inspection, positioning of the hand was off-center from the object by as much as 8 cm in the plane of the workspace, and 4 cm in the normal direction.

Errors in each trial could have come from a number of sources. The calculation of the radius of the object (which was used in determining the target position of the hand) was subject to large errors (Table III). Other factors that likely contributed to errors were camera resolution (1.97 mm/pixel) and calibration error, shadows, errors in identifying "object" pixels in the workspace image, small robot positioning errors, and hysteresis in the viscoelastic joints of the hand.

One advantage of the embodiment presented here is the use of elastomer joints that are compliant in more than one direction. For example, these joints can bend in the forward-backwards direction, and also to rotate about axis of the adjacent link. This means the fingers comply around the object to be grasped and enclose it, without the need for active sensing and control. When the tendons are subsequently actuated to fully grasp the object, the fingers become stiff in the configuration they attained during the complaint phase. This produces a firm grasp around the object with the need for actuation in every direction. Sensors can be configured about the joint to provide measurements of the motion in each direction of travel for control purposes.

These examples empirically demonstrate that optimized passively compliant joints and adaptive coupling can allow the grasping system to adapt to the large positioning errors that can occur in these types of tasks. Even with simplified positioning and control (three degree of freedom arm with no wrist, a single actuator for the eight joints of the hand, and feedforward hand control), we are able to grasp 5 cm-scale objects in the presence of positioning error of up to 100% of the object size and 10 cm-scale objects in the presence of positioning error of up to 33% of the object size. We are also able to reliably grasp a wide range of spherical objects positioned arbitrarily across the robot workspace using only simple processing of a single image to guide the task.

Note that the use of the camera in the second experiment was intentionally simple. We are not interested in trying to extract the most information from the camera image, nor are we suggesting the best way to analyze the physical properties of the target object. Our aim was to test hardware system performance, even under large uncertainties due to poor sensing.

One of the goals of this invention was to simplify the amount of processing and control necessary to perform robust grasping. The use of the hand in these experiments is purely feedforward—once the target and size position is estimated based on a single workspace image, no further information about the object is used to execute the task. Additionally, such simple processing of the visual information and control of the hand allows for easy implementation on microcontroller-based and other simplified robot platforms.

There are a number of logical extensions to this work. The degree of autonomy demonstrated here can easily be expanded upon by utilizing the sensory information available from the joint angle and contact sensors already included in the hardware of the hand. This information, used in conjunction with an approximate model of object size and location from basic visual sensing, will make the grasping task even more robust to variations in object shape and position. Additional orientation degrees of freedom will also improve the performance by better relating hand and object geometry.

The ability of the hand to perform complicated grasping tasks can be further evaluated by operating the manipulator in teleoperation mode, allowing for more precise and dexterous positioning in order to perform more sensitive tasks. Preliminary study of use of this mode indicates that a broad range of difficult tasks can be performed even with simple kinematics and hand control.

While many different processes and materials may be used in connection with the present invention, a manufacturing technique manufacturing technique called Shape Deposition Manufacturing (SDM) is a preferred method for manufacturing a hand or grasper in accordance with a preferred embodiment of the present invention. See R. Merz, F. B. Prinz, K. Ramaswami, M. Terk, L. Weiss, "Shape Deposition Manufacturing," Proceedings of the Solid Freeform Fabrication Symposium, University of Texas at Austin, Aug. 8-10, 1994 and M. Binnard and M. R. Cutkosky, "A Design by Composition Approach for Layered Manufacturing," ASME Transactions, J. Mech. Design, vol. 122, no. 1, pp 91-101, 2000. This rapid prototyping process involves a cycle of deposition of part material and shaping, building up the part in distinct layers, and resulting in the concurrent manufacture and assembly of the part. In this way, the part can be manufactured in multiple sections or layers, allowing manipulation of the internal parts of the final structure. A diagram detailing the process is shown in FIG. 1 and an example use of the process with detailed steps is laid out in the next section.

This process has a number of advantages over other prototyping techniques. The deposition of part material allows components to be embedded into the part during production, eliminating the need for fasteners, and reducing the likelihood of damage to the component by encasing it within the part structure. This is a particularly desirable property for the inclusion of fragile components such as sensors, greatly increasing the robustness of the part. Also, depositing the part in layers permits the use of dissimilar materials, allowing for variation of mechanical properties within the same part. This property can be utilized to create complex mechanisms from a single part. See C. Stefanini, M. R. Cutkosky, P. Dario, "A high force miniature gripper fabricated via shape deposition manufacturing," Proceedings of the 2003 International Conference on Robotics and Automation, Taipei, Taiwan, 2003; J. E. Clark, J. G. Cham, S. A. Bailey, E. M. Froehlich, P. K. Nahata, R. J. Full, M. R. Cutkosky, "Biomimetic design and fabrication of a hexapedal running robot," Proceedings of the 2001 International Conference on Robotics and Automation, Seoul, Korea, 2001; and B. H. Park, M. Shantz, F. B. Prinz, "Scalable rotary actuators with embedded shape memory alloys," Proceedings of SPIE, The International Society for Optical Engineering, vol. 4327, pp. 79-87, 2001.

Due to its relative simplicity, custom tooling is not required to realize the SDM process. Complex part geometries can be attained using common computer numerical controlled (CNC) mill machines.

The steps of the SDM process used to produce our compliant grasper fingers. Pockets corresponding to the shape of the stiff links of our fingers are machined into a high-grade machine wax (Freeman Manufacturing and Supply Co., Akron, Ohio, USA). The components, such as tendon cables, Hall sensors, connectors, magnets, and low-friction tubes, are put into place in the pockets in the high grade machine wax, and the polymer resin poured. Modeling clay is used to dam any areas to be blocked from the resin. After the layer cures, a second group of pockets is machined (both into the support wax and the stiff resin) and dammed. The polymer resins for the compliant finger joints (white) and soft fingerpads (clear) are then poured and allowed to cure. The block is then faced off to level the surface and remove surface flaws, and the completed fingers removed from the wax support material. The entire process takes approximately 30 hours to complete, only 4 of which require human intervention.

The polymers used are two-part industrial polyurethanes. Different compositions are used for the soft fingerpads, compliant joints, and stiff links (IE35A, IE90A, and IE72DC, respectively, Innovative Polymers, St. Johns, Mich., USA). Degassing at −737 mmHg (−29"Hg) was sometimes necessary to prevent voids in the cured resins. Table I shows material properties of these three polyurethanes as provided by the manufacturer.

A tactile sensor may be integrated with the soft fingerpads of the fingers. For example, an array of these sensors can be used to sense a two-dimensional pressure distribution across the fingerpad. A sensor of a preferred embodiment uses a reflective object sensor (OPB608R, 660 nm emitter wavelength, Optek Technology, Carrolton, Tex., USA) that consists of an LED and photodetector. As the finger applies force to an object, the pad deforms inwards, bringing the reflective inner surface of the fingerpad closer to the embedded sensor and causing a change in detector current. The slanted struts reduce stiffness in the normal contact direction. Black and white dyes were used in the support and pad materials to shield the sensor from ambient visible light and increase reflectance. The sides of the sensor can also be easily enclosed.

The stiffness of the pad is very low—on the order of 1 kN/m, depending on contact location and geometry. The contact geometry plays a role in sensor output. This effect is due to both the difference in effective stiffness and the curvature of the reflective surface, which can deform with small objects to deflect light away from the detector. Note the higher sensitivity to smaller loads, a property useful in contact detection.

Although the described embodiment contains only one optical sensor, multiple sensors can be embedded in the pad at about one every fifteen millimeters under the current design. Combining an array of the tactile sensors into a fingerpad will yield an inexpensive, compliant, distributed pressure sensor that can sense contact location on the fingerpad, as well as determine object geometry based on contact location. The array density, or contact position resolution, is limited only by the size of the emitter/detector package.

In another embodiment of the present invention a piezoelectric polymer film element (model LDTO-028K, MSI sensors, Hampton, Va., USA) may be integrated into a compliant pad to make a robust, low-threshold contact sensor. These sensors generate an electrical charge in proportion to the applied strain, have excellent frequency sensitivity, but no static response. By embedding the flexible sensor just under the contact surface, we sense the transient when the fingerpad is deformed on initial contact.

To test the resolution of the sensor to a short contact, a load of 0.03 N was quickly removed from the sensor in less than 10 ms. This stimulus produced a 200 mV peak response, approximately 5 times the RMS sensor noise (40 mV). The sensor can therefore quickly respond to low force contact transients. This allows a manipulator to react quickly to minimize contact forces with the environment, yet still operate at a reasonable speed.

Similar sensors have been developed for contact and transient detection, as well as perception of small shapes and incipient slips. See R. D. Howe and M. R. Cutkosky, "Dynamic tactile sensing: Perception of fine surface features with stress rate sensing," IEEE Trans. on Robotics and Automation 9(2):140-151, April 1993. The sensor was fabricated as a separate device and then assembled with the robot finger. While this provided good sensitivity, the need for assembly increased the complexity of the fabrication process and reduced the durability of the resulting gripper in comparison to the present SDM approach.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A compliant underactuated grasper comprising:
   a base; and
   a plurality of fingers, wherein at least one of said plurality of fingers comprises:
   a link;
   a joint connecting said link to said base, said joint being compliant in first and second directions, wherein said joint comprises a joint flexure and a compliance of said joint flexure in said second direction is stiffer than a compliance of said joint flexure in said first direction; and
   a member for moving said link;
   wherein said member acts in parallel to said first direction of compliance of said joint such that actuation of said member substantially changes said compliance of said joint in said first direction, and wherein said grasper has fewer actuators than degrees of freedom.

2. The compliant underactuated grasper according to claim 1, wherein said member comprises a tendon cable.

3. The compliant underactuated grasper according to claim 2, further comprising an actuator for actuating a tendon cable, wherein said actuator actuates a plurality of tendon cables and wherein each of said tendon cables changes a compliance in a joint in a different one of said plurality of fingers.

4. The compliant underactuated grasper according to claim 3, wherein said actuator comprises a DC motor.

5. The compliant underactuated grasper according to claim 1, wherein said joint has a viscoelastic response to provide damping.

6. The compliant underactuated grasper according to claim 1, further comprising a sensor for sensing a position of said joint.

7. The compliant underactuated grasper according to claim 1, wherein said link comprises a distal link of said finger.

8. The compliant underactuated grasper according to claim 1, wherein a plurality of sensors are mounted on or under the surface of the fingers to sense contact.

9. The compliant underactuated grasper according to claim 1, wherein said at least one finger further comprises:
   a second link; and
   a second joint connecting said second link to said link, said second joint being compliant in said first direction;
   wherein movement of said member substantially changes said compliance of said second joint in said first direction.

10. The compliant underactuated grasper according to claim 9, wherein said second link comprises a proximal link of said finger.

11. The compliant underactuated grasper according to claim 1, wherein said base comprises a second link.

12. A compliant underactuated grasper comprising:
    a base; and
    a plurality of fingers, wherein as least one of said plurality of fingers comprises:
    a first link;
    a second link;
    a first joint connecting said first link to said second link, said joint being compliant in a first direction;
    a second joint connecting said second link to said base, said second joint being compliant in a second direction; and
    a tendon cable for moving said first and second links;
    wherein said tendon cable is in parallel to said first direction of compliance such that movement of said tendon cable substantially changes said compliance of said first joint in said first direction, and wherein said grasper has fewer actuators than degrees of freedom.

13. The compliant underactuated grasper according to claim 12, wherein said grasper comprises an artificial hand.

14. A compliant underactuated grasper comprising:
    a base; and
    a plurality of fingers, wherein at least one of said plurality of fingers comprises:
    a link;
    a joint connecting said link to said base, said joint being compliant in first and second directions, wherein said joint comprises a joint flexure and a compliance of said joint flexure in said second direction is stiffer than a compliance of said joint flexure in said first direction; and
    a member for moving said link; and
    wherein said member acts in parallel to said first directions of compliance of said joint such that actuation of said member substantially changes said compliance of said joint in said first direction, and wherein said grasper has fewer actuators than degrees of freedom.

15. The compliant underactuated grasper according to claim 14, wherein said two directions of compliance comprise a first direction of compliance in a plane of movement of said one of said plurality of said fingers and a second direction of compliance normal to said plane of movement of said one of said plurality of said fingers.

16. The compliant underactuated grasper according to claim 15, further comprising a plurality of sensors.

17. The compliant underactuated grasper according to claim 14, further comprising:
    an adaptive transmission that allows some links to keep moving after others have made contact with an object; and wherein said grasper has fewer actuators than degrees of freedom.

18. The compliant underactuated grasper according to claim 17, further comprising a plurality of viscoelastic joints.

* * * * *